US009467694B2

(12) United States Patent
Yu et al.

(10) Patent No.: US 9,467,694 B2
(45) Date of Patent: Oct. 11, 2016

(54) IMPLICIT DETERMINATION AND COMBINED IMPLICIT AND EXPLICIT DETERMINATION OF COLLOCATED PICTURE FOR TEMPORAL PREDICTION

(71) Applicant: Google Technology Holdings LLC, Mountain View, CA (US)

(72) Inventors: Yue Yu, San Diego, CA (US); Krit Panusopone, San Diego, CA (US); Limin Wang, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 353 days.

(21) Appl. No.: 13/682,590

(22) Filed: Nov. 20, 2012

(65) Prior Publication Data

US 2013/0128977 A1 May 23, 2013

Related U.S. Application Data

(60) Provisional application No. 61/561,931, filed on Nov. 21, 2011, provisional application No. 61/562,426, filed on Nov. 21, 2011.

(51) Int. Cl.
*H04N 7/26* (2006.01)
*H04N 7/12* (2006.01)
(Continued)

(52) U.S. Cl.
CPC ...... *H04N 19/00575* (2013.01); *H04N 19/463* (2014.11); *H04N 19/503* (2014.11); *H04N 19/52* (2014.11); *H04N 19/577* (2014.11)

(58) Field of Classification Search
CPC ........... H04N 11/02; H04N 7/26; H04N 7/12

USPC ........................................ 375/240.16, 240.12
See application file for complete search history.

(56) References Cited

U.S. PATENT DOCUMENTS

2003/0058238 A1 3/2003 Doak et al.
2003/0107815 A1 6/2003 Redmond
(Continued)

FOREIGN PATENT DOCUMENTS

EP         1422946       5/2004
WO    WO2011050641      5/2011
WO    WO2013116608 A1   8/2013

OTHER PUBLICATIONS

Bross B et al: "WD4: Working Draft 4 of High-Efficiency Video Coding", 6. JCT-VC Meeting; 97. MPEG Meeting; Jul. 14, 2011-Jul. 22, 2011; Torino; (Joint Collaborative Team on Video Coding of ISO/IEC JTC1/SC29/WG11 and ITU-T SG.16 ) ; URL: HTTP://WFTP3.ITU.INT/AV-ARCH/JCTVC-SITE/,, No. JCTVC-F803. Sep. 8, 2011 XP838889888.

(Continued)

*Primary Examiner* — Sath V Perungavoor
*Assistant Examiner* — Patricia I Young
(74) *Attorney, Agent, or Firm* — Young Basile Hanlon & MacFarlane, P.C.

(57) ABSTRACT

In one embodiment, a method determines a current picture and determines at least one of a first list of reference pictures and a second list of reference pictures for the current picture. A temporal distance is analyzed between the current picture and at least a portion of the reference pictures in the at least one of a first list of reference pictures and a second list of reference pictures. The method then selects reference picture that is closest in temporal distance from the current picture in the analyzed at least a portion of the reference pictures. The selected reference picture is set as a collocated picture for the current picture and the selected reference picture is used in a temporal prediction process for the current picture.

30 Claims, 10 Drawing Sheets

(51) Int. Cl.
H04N 19/503 (2014.01)
H04N 19/52 (2014.01)
H04N 19/463 (2014.01)
H04N 19/577 (2014.01)

(56) References Cited

U.S. PATENT DOCUMENTS

| | | | |
|---|---|---|---|
| 2005/0013365 A1 | 1/2005 | Mukerjee et al. |
| 2005/0046702 A1 | 3/2005 | Katayama et al. |
| 2005/0053137 A1 | 3/2005 | Holcomb |
| 2005/0117646 A1 | 6/2005 | Joch et al. |
| 2005/0152452 A1 | 7/2005 | Suzuki |
| 2005/0232356 A1 | 10/2005 | Gomi et al. |
| 2005/0276448 A1 | 12/2005 | Pryor |
| 2006/0104349 A1 | 5/2006 | Joch et al. |
| 2006/0219857 A1 | 10/2006 | Satterfield |
| 2006/0233252 A1 | 10/2006 | Bhattacharya et al. |
| 2007/0063997 A1 | 3/2007 | Scherer et al. |
| 2007/0286281 A1 | 12/2007 | Tsuchiya et al. |
| 2008/0136923 A1 | 6/2008 | Inbar et al. |
| 2008/0267290 A1 | 10/2008 | Barbieri et al. |
| 2009/0003446 A1 | 1/2009 | Wu et al. |
| 2009/0021588 A1 | 1/2009 | Border et al. |
| 2009/0129472 A1 | 5/2009 | Panusopone et al. |
| 2009/0168886 A1 | 7/2009 | Ikeda et al. |
| 2010/0111182 A1 | 5/2010 | Karczewicz et al. |
| 2011/0002389 A1 | 1/2011 | Xu et al. |
| 2011/0110428 A1 | 5/2011 | Chang et al. |
| 2011/0228852 A1 | 9/2011 | Budagavi |
| 2012/0082229 A1 | 4/2012 | Su et al. |
| 2012/0236942 A1 | 9/2012 | Lin et al. |
| 2013/0128967 A1 | 5/2013 | Yu et al. |
| 2013/0128969 A1 | 5/2013 | Yu et al. |
| 2013/0128970 A1 | 5/2013 | Yu et al. |
| 2013/0163663 A1 | 6/2013 | Yu et al. |
| 2013/0182769 A1 | 7/2013 | Yu et al. |
| 2013/0202034 A1 | 8/2013 | Yu et al. |
| 2013/0272375 A1 | 10/2013 | Yu et al. |
| 2013/0272406 A1 | 10/2013 | Yu et al. |
| 2014/0023142 A1 | 1/2014 | Yu et al. |
| 2014/0056356 A1 | 2/2014 | Yu et al. |

OTHER PUBLICATIONS

Yu Y et al: "Simplification of MVP Design for HEVC", 6. JCT-VC Meeting; 97. MPEG Meeting; Jul. 14, 2011-Jul. 22, 2011; Torino; (Joint Collaborative Team on Video' Coding of ISO/IEC JTCI/SC29/WG11 and ITU-TSG.16 ); URL: HTTP://WFTP3.ITU.INT/AV-ARCH/JCTVC-SITE/,, No. JCTVC-F575, Jul. 19, 2011, XP030009598.

Yu Yue et al: "The Reference Picture Construction of Combined List for HEVC", 7. JCT-VC Meeting; 98. MPEG Meeting; Nov. 21, 2011-Nov. 30, 2011; Geneva; (Joint Collaborative Team on Video Coding of ISO/IEC/JTCI/SC29/WG11 and ITU-T SG.16 ); URL: HTTP://WFTP3.ITU.INT/AV-ARCH/JCTVC-SITE/,, No. JCTVC-G717, Nov. 10, 2011 (2811-11-10).

Fang S et al: "The Construction of Combined List for HEVC", 6. JCT-VC Meeting; 97. MPEG Meeting; ul. 14, 2011-Jul. 22, 2011; Torino; (Joint Collaborative Team on Video Coding of ISO/IEC JTCI/SC29/WG11 and ITU-T SG;16 ); URL: HTTP://WFTP3.ITU.INT/AV-ARCH/JCTVC-SITE/,, No. JCTVC-F573, Jul. 16, 2011.

Toshiyasu Sugio et al: CE9: Experiment A, I, J and S Modified derivation process of reference index for skip mode and temporal motion vector predictor, Mar. 18, 2011, No. JCTVC-E230, Mar. 18, 2011.

J-L Lin et al: "Improved Advanced Motion Vector Prediction", 4. JCT-VC Meeting; 95. MPEG Meeting; JAn. 20, 2011-Jan. 28, 2011; Daegu;(Joint Collaborative Team on Video Coding of ISO/IEC JTCI/SC29/WG11AND ITU-T SG.16 ); URL: HTTP://WFTP3.ITU.INT/AV-ARCH/JCTVC-SITE/,, No. JCTVC-DI25. Jan. 15, 2011. XP030008165.

Jian-Liang Lin et al: "Motion vector coding techniques for HEVC", Multimedia Signal Processing (MMSP), 2011 IEEE 13th International Workshop On. IEEE. Oct. 17, 2011. pp. 1-6, XP03202755.

Byeong-Moon Jeon. Alexis Michael Tourapis: "B pictures in JVT". 4. JVT Meeting; 61. MPEG Meeting; Jul. 22, 2002-Jul. 26, 2002; Klagenfurt.AT; (Joint Video Team of ISO/IEC JTCI/SC29/WG11 and ITU-T SG.16 ), No. JVT-DI55. Jul. 26, 2002, XP030005418.

Patent Cooperation Treaty, International Search Report and Written Opinion of the International Searching Authority for International Application No. PCT/US2012/065850, Feb. 27, 2013, 17 pages.

Patent Cooperation Treaty, "PCT Search Report and Written Opinion of the International Searching Authority" for International Application No. PCT/US2012/066146 dated Feb. 20, 2013, 15 pages.

I-K Kim et al: "Restriction on motion vector scaling for Merge and AMVP", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/,, No. JCTVC-G551, Nov. 8, 2011, XP030110535.

Sjaberg R et al: "Absolute signaling of reference pictures", 6. JCT-VC Meeting; 97. MPEG Meeting; Jul. 14, 2011-Jul. 22, 2011; Torino; (Joint Collaborative Team on Video Coding of ISO/IEC JTCI/SC29/WG11 and ITU-T SG.16 ); URL: HTTP://WFTP3.ITU.INT/AV-ARCH/JCTVC-SITE/,, No. JCTVC-F493, Jul. 22, 2011, XP030009516.

Yu Y et al: "Implicit Signaling of collocated picture for HEVC", 99. MPEG Meeting; Jun. 2, 2012-Oct. 2, 2012; San Josa CR ; (Motion Picture Expert Group or ISO/IEC JTCI/SC29/WG11),, No. M23429, Jun. 7, 2012, XP030051954.

Yu Y et al: "Modifications on signaling collocated picture", 9. JCT-VC Meeting; 100. MPEG Meeting; Apr. 27, 2012-Jul. 5, 2012; Geneva; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/,, No. JCTVC-10266, Apr. 17, 2012, XP030112029.

Yu Y et al: "AHG21: The Improvements on Reference Picture Buffering and List Construction", 7. JCT-VC Meeting; 98. MPEG Meeting; Nov. 21, 2011-Nov. 30, 2011; Geneva; (Joint Collaborative Team on Video Coding of ISO/IEC JTCI/SC29/WG11 and ITU-T SG.16 ); URL: HTTP://WFTP3.ITU.INT/AV-ARCH/JCTVC-SITE/,, No. JCTVC-G717, Nov. 10, 2011, XP030110701.

Guillaume Laroche et al.: "On memory compression for motion vector prediction", Mar. 10, 2011, No. JCTVC0E221, Mar. 10, 2011 all pages.

ISR & Written Opinion RE: application PCTUS2012070871 dated Mar. 19, 2013, 15 pages.

ISR, "ISR Search Report and Written Opinion of the International Searching Authority" for International Application No. ISR/US2013055968 dated Nov. 22, 2013 , 9 pages.

ISR, & Written Opinion of the International Searching Authority fo International Application No. ISR/US2012/065699 (C539529), Jan. 25 , 16 Pages.

ISR, & Written Opinion of the International Searching Authority for International Application No. ISR/US2013024294, Jul. 3, 2013, 13 pages.

ISR, & Written Opinion of the International Searching Authority for International Application No. ISR/US2013025988, May 14, 2013, 11 pages.

ISR, & Written Opinion of the International Searching Authority for International Application No. ISR/US2013025994, May 15, 2013, 12 pages.

ISR, & Written Opinion of the International Searching Authority for International Application No. ISR/US2013054965, Oct. 22, 2013, 12 pages.

J-L Lin et al.: "Syntax for AMVP Parsing Error Control", 95. MPEG Meeting; Jan. 24, 2011-Jan. 28, 2011; Daegu; (Motion Ipcture Expert Group or ISO/IEC JTC1/SC29/WG11),, No. m18878, Jan. 23, 2011, all pages.

Jung J et al.: Temporal MV predictor modification for MV-Comp, Skip Direct and Merge schemes, 4. JCT-VC Meeting; 95, MPEG Meeting; Jan. 20, 2011-Jan 28, 2011; Daegu; (Joint Collaborative Team on Video Coding of ISO/IEC JCT1/SC29/WG11 and ITU-T SG16); URL; HTTP://WFTP3.ITU.INT/AV-ARCH/JCTVC-SITE/, No. JCTVC-D164, Jan. 15, 2011, all pages.

(56) References Cited

OTHER PUBLICATIONS

Kadono: "Memory Reduction for Temporal Direct Mode", 5, JVT Meeting; Oct. 14, 2002-Oct. 18, 2002; Geneva, CH; (Joint Video Team of ISC/IEC JTC1/SC29/WG11 and ITU-T SG16), No. JVT-E076, Oct. 18, 2002, all pages.

Li (USTC) B et al.: "High-level Syntax: Marking process for non-TMVP pictures", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG. 16); URL: HTTP://WFTP3.ITU.INT/AV-ARCH/JCTVC-SITE/,, No. JCTV-G398, Nov. 8, 2011, all pages.

Li (USTC) B et al: "Constrained temporal motion vector prediction for error resillience", 4. JCT-VC Meeting; 95. MPEG Meeting; Jan. 20, 2011-Jan. 28, 2011; Daegu; (Joint Collaborative Team on Video Coding of ISO/IEC JTC1/SC29/WT11 and ITU-T SG.16); URL:HTTP://WFTP3.ITU.INT/AV-ARCH/JCTVC-SITE/,, No. JCTVC-D139, Jan. 15, 2011, all pages.

Li et al.,"Redundancy reduction in B-Frame coding at temporal level zero" Joint Collaborative Team on Video Coding (JCT-VC) of ITU-T SG16 WP3 and ISO/IEC JTC1/SC29/WG11; 3rd Meeting: Guangzhou, CN; Oct. 7-15, 2010; 6 pages.

Suzuki et al., "Extension of uni-prediction simplification in B slices" Joint Collaborative Team on Video Coding (JCT-VC) of ITU-T SG16 WP3 and ISO/IEC JTC1/SC29/WG11; 4th Meeting: Daegu. Lorea; JCTVC-D421 Jan. 20-28, 2011; 8 pages.

W-S Kim et al.: "Non-CE8: Method of visual coding artifact removal for SAO"> 7. JCT-VC Meeting; 98. MPEG Meeting; Nov. 21, 2011-Nov. 30, 2011; Geneva; (Joint Collaborative Team on Video Coding of ISO-IEC JTC1/SC29/WG11 and ITU-T SG.16) URL: HTTP://WFTP3.ITU.INT/AV-ARCH/JCTVC-SITE/,, No. JCTVC-G680, Nov. 9, 2011, all pages.

Y-K Wang et al.: AHG15: On sequence parameter set and picture parameter set, 7, JCT-VC Meeting; 98, MPEG Meeting; Nov. 21, 2011-Nov. 20, 2011; Geneva; (Joint Collaborative Team on Video Coding of ISO/IEC JTC1/SC29/WG11 and ITU-T SG16); URL: http://wftp3.itu.int/av-arch/jctvc-site/, No. JCTVC-G344, Nov. 9, 2011, all pages.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Mozilla, "Introduction to Video Coding Part 1: Transform Coding", Video Compression Overview, Mar. 2012, 171 pp.

Overview; VP7 Data Format and Decoder. Version 1.5. On2 Technologies, IxNC. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

VP6 Bitstream & Decoder Specification. Version 1.02. On2 Technologies, IxNC. Dated Aug. 17, 2006.

VP6 Bitstream & Decoder Specification. Version 1.03. On2 Technologies, IxNC. Dated Oct. 29, 2007.

VP8 Data Format and Decoding Guide. WebM Project. Google On2. Dated: Dec. 1, 2010.

REFERENCE PICTURE SET SYNTAX

| ref pic set (idx) { | DESCRIPTOR |
|---|---|
| num_negative_pics | ue(v) |
| num_positive_pics | ue(v) |
| for ( i = 0; i < num negative pics; i ++ ) { | |
| delta_p o c_s0_minus1[ i ] | ue(v) |
| used_by_curr_pic_s0_flag[ i ] | u(1) |
| } | |
| for (i = 0; i < num positive pics; i++) { | |
| delta_poc_s1_minus1 [ i ] | ue(v) |
| used_by_curr_pic_s1_flag [ i ] | u(1) |
| } | |
| * if(NumRpsCurr0 > 1) | |
| * collocated_picture_idx_list0 | u(v) |
| * if(NumRpsCurr1 > 1) | |
| * collocated_picture_idx_list1 | u(v) |
| } | |

SLICE HEADER SYNTAX

| | |
|---|---|
| slice_type | ue(v) |
| } | |
| if(slice_type==B) | |
|    collocated_from_l0_flag | u(1) |
| if(collocated_from_l0_flag){ | |
|    if(NumRpsCurr0>1) | |
|      collocated_picture_idx | u(v) |
| } | |
| else{ | |
| if(NumRpsCurr1>1) | |
|    collocated_picture_idx | u(v) |
| } | |

FIG. 13

IMPLICIT DETERMINATION AND COMBINED IMPLICIT AND EXPLICIT DETERMINATION OF COLLOCATED PICTURE FOR TEMPORAL PREDICTION

CROSS REFERENCE TO RELATED APPLICATIONS

The present disclosure claims priority to:

U.S. Provisional App. No. 61/561,931 for "An Implicit Way for Signaling Collocated Picture for HEVC" filed Nov. 21, 2011; and U.S. Provisional App. No. 61/562,426 for "A Combined Way for Signaling Collocated Picture for HEVC" filed Nov. 21, 2011, the contents of all of which are incorporated herein by reference in their entirety.

The present disclosure is related to U.S. patent application Ser. No. 13/680,531 for "An Explicit Way for Signaling a Collocated Picture for High Efficiency Video Coding (HEVC)", filed on Nov. 19, 2012, the contents of which is incorporated herein by reference in its entirety.

BACKGROUND

Video compression systems employ block processing for most of the compression operations. A block is a group of neighboring pixels and may be treated as one coding unit in terms of the compression operations. Theoretically, a larger coding unit is preferred to take advantage of correlation among immediate neighboring pixels. Various video compression standards, e.g., Motion Picture Expert Group (MPEG)-1, MPEG-2, and MPEG-4, use block sizes of 4×4, 8×8, and 16×16 (referred to as a macroblock (MB)).

High efficiency video coding (HEVC) is also a block-based hybrid spatial and temporal predictive coding scheme. HEVC partitions an input picture into square blocks referred to as coding tree units (CTUs) as shown in FIG. 1. Unlike prior coding standards, the CTU can be as large as 128×128 pixels. Each CTU can be partitioned into smaller square blocks called coding units (CUs). FIG. 2 shows an example of a CTU partition of CUs. A CTU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of CTU 100. Further, a CU 102-2 has been split into four CUs 102-5, 102-6, 102-7, and 102-8.

Each CU 102 may include one or more blocks, which may be referred to as prediction units (PUs). FIG. 3 shows an example of a CU partition of PUs. The PUs may be used to perform spatial prediction or temporal prediction. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s).

In HEVC, motion vectors (MVs) are predictively coded in a temporal prediction process. For a current PU having one current motion vector and an associated reference index, a motion vector predictor (MVP) is derived from motion vectors of spatially neighboring or temporally collocated PUs of the current PU. The difference between the current motion vector and the MVP is then determined and coded. This reduces overhead as only the difference is sent instead of information for the current motion vector. Also, when in merge mode, a single motion vector may be applied to a group of spatially neighboring or temporally collocated PUs.

Given a current PU in a current picture, an associated collocated PU resides in an associated collocated picture. The collocated PU is used as one of the candidates for the MVP or in a merge/skip mode for the current PU. The collocated picture is a reference picture specified in either a list0 or a list1. A flag may be set to indicate which list the collocated PU should be defined from. For example, the flag can be set to 1 to indicate that the reference picture that contains a collocated partition shall be defined from list0, otherwise the reference picture shall be defined from list1.

Once an encoder or decoder determines the list that contains the collocated picture, the encoder or decoder uses the first reference picture in either list0 or list1. That is, the reference picture with an index of 0 in list0 or list1 is selected. In some cases, the first reference picture in list0 or list1 may not be the optimal reference picture to use when performing a temporal prediction process for the current PU.

SUMMARY

In one embodiment, a method determines a current picture and determines at least one of a first list of reference pictures and a second list of reference pictures for the current picture. A temporal distance is analyzed between the current picture and at least a portion of the reference pictures in the at least one of a first list of reference pictures and a second list of reference pictures. The method then selects reference picture that is closest in temporal distance from the current picture in the analyzed at least a portion of the reference pictures. The selected reference picture is set as a collocated picture for the current picture and the selected reference picture is used in a temporal prediction process for the current picture.

In one embodiment, a method is provided comprising: determining, by a computing device, a current picture; determining, by the computing device, at least one of a first list of reference pictures and a second list of reference pictures for the current picture; analyzing, by the computing device, a temporal distance between the current picture and at least a portion of the reference pictures in the at least one of a first list of reference pictures and a second list of reference pictures; selecting, by the computing device, a reference picture that is closest in temporal distance from the current picture in the analyzed at least a portion of the reference pictures; and setting, by the computing device, the selected reference picture as a collocated picture for the current picture, wherein the selected reference picture is used in a temporal prediction process for the current picture.

In one embodiment, a method is provided comprising: determining, by a computing device, a value of a flag indicating which of a first list of reference pictures or a second list of reference pictures to use; if the value is a first value, selecting, by the computing device, a reference picture with a minimum absolute temporal distance from a current picture in eligible reference pictures in the first list; if the value is a second value, selecting, by the computing device, a reference picture with a minimum absolute temporal distance from a current picture in eligible reference pictures in the second list; setting, by the computing device, a value of a variable to indicate a position of the selected reference picture in either the first list or the second list, wherein the selected reference picture includes a collocated block to a current block in the current picture for use in a temporal prediction process.

In one embodiment, a decoder is provided comprising: one or more computer processors; and a non-transitory computer-readable storage medium comprising instructions that, when executed, control the one or more computer processors to be configured for: determining a current picture; determining at least one of a first list of reference pictures and a second list of reference pictures for the current picture; analyzing a temporal distance between the current picture and at least a portion of the reference pictures in the at least one of a first list of reference pictures and a second list of reference pictures; selecting a reference picture that is closest in temporal distance from the current picture in the analyzed at least a portion of the reference pictures; and setting the selected reference picture as a collocated picture for the current picture, wherein the selected reference picture is used to decode the current picture in a temporal prediction process.

In one embodiment, an encoder is provided comprising: one or more computer processors; and a non-transitory computer-readable storage medium comprising instructions that, when executed, control the one or more computer processors to be configured for: determining a current picture; determining at least one of a first list of reference pictures and a second list of reference pictures for the current picture; analyzing a temporal distance between the current picture and at least a portion of the reference pictures in the at least one of a first list of reference pictures and a second list of reference pictures; selecting a reference picture that is closest in temporal distance from the current picture in the analyzed at least a portion of the reference pictures; and setting the selected reference picture as a collocated picture for the current picture, wherein the selected reference picture is used to encode the current picture in a temporal prediction process.

The following detailed description and accompanying drawings provide a better understanding of the nature and advantages of particular embodiments.

BRIEF DESCRIPTION OF THE DRAWINGS

FIG. 13 provides a syntax listing illustrating another embodiment for identifying a collocated picture for use in decoding a current picture using a common reference picture list.

DETAILED DESCRIPTION

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Implicit Determination of Collocated Picture

Overview

Figure 1:
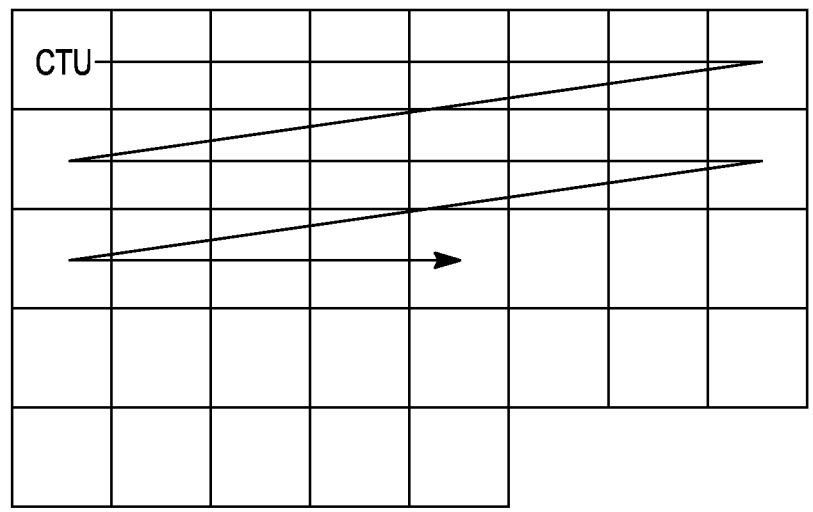
FIG. 1 shows an input picture partitioned into square blocks referred to as coding tree units (CTUs).
Figure 2:
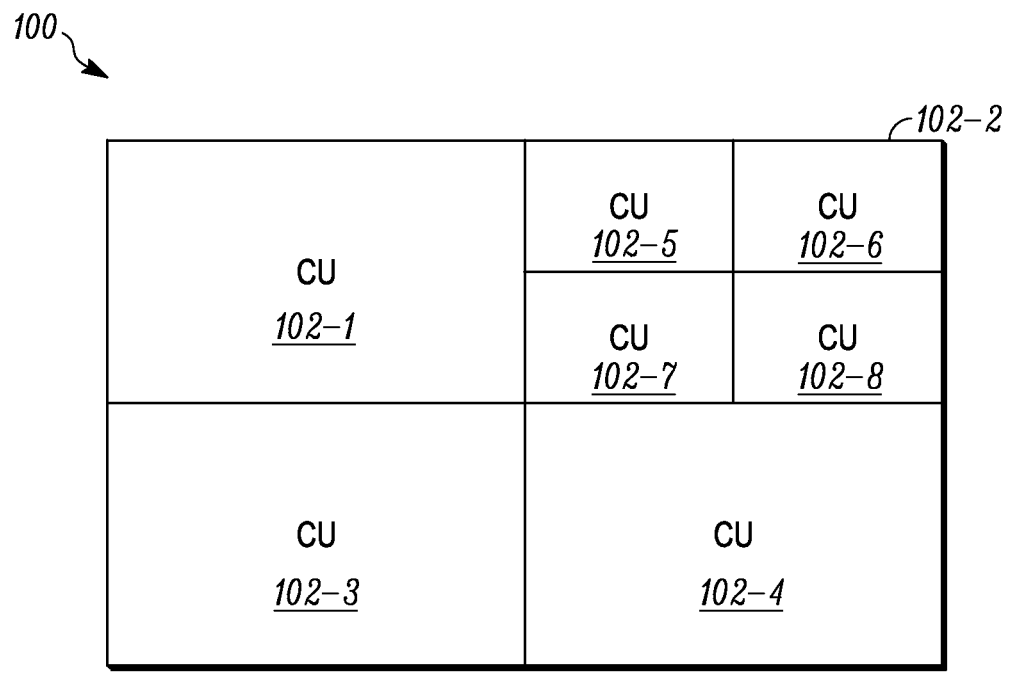
FIG. 2 shows an example of a CTU partition of CUs.
Figure 3:
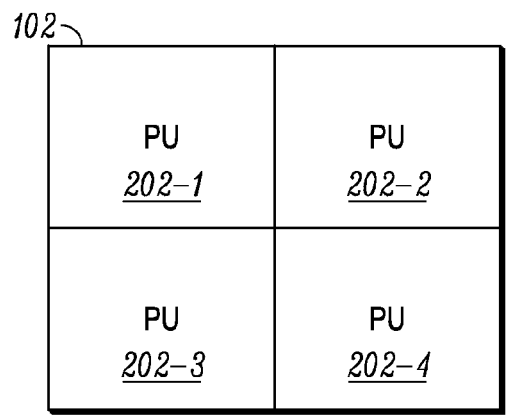
FIG. 3 shows an example of a CU partition of PUs.
Figure 4:
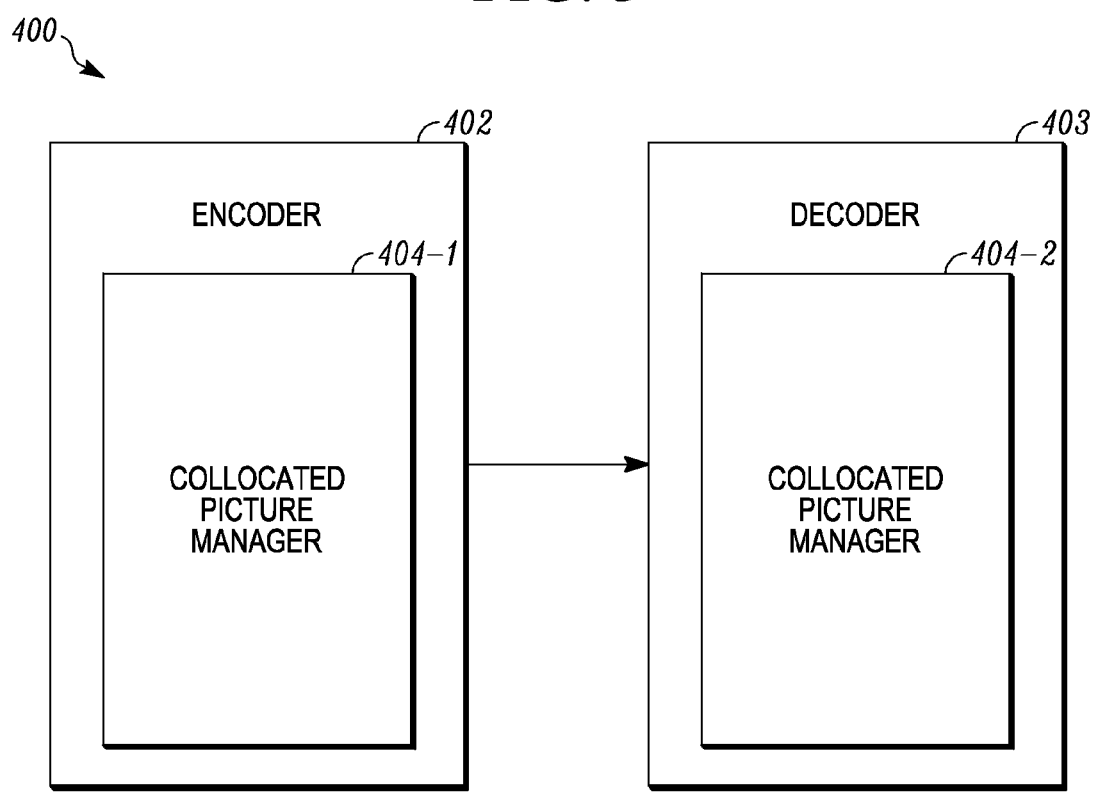
FIG. 4 depicts an example of a system for encoding and decoding video content according to one embodiment.

FIG. 4 depicts an example of a system 400 for encoding and decoding video content according to one embodiment. Encoder 402 and decoder 403 may encode and decode a bitstream using HEVC; however, other video compression standards may also be appreciated.

Encoder 402 includes a collocated picture manager 404-1 and decoder 403 includes a collocated picture manager 404-2. In particular embodiments, both collocated picture managers 404-1 and 404-2 "implicitly" determine a reference picture to use as a collocated picture for a current picture. By implicitly determining the reference picture to use as the collocated picture, encoder 402 and decoder 403 may independently make this determination without any signaling of which collocated picture is selected. For example, encoder 402 does not signal to decoder 403 which reference picture the encoder selected as the collocated picture. Rather, collocated picture manager 404-1 and collocated picture manager 404-2 independently determine the same reference picture to use as the collocated picture for a current picture. The algorithms used to determine the reference picture to use as the collocated picture will be described in more detail below.

The selected collocated picture includes motion vector (MV) information that can be used in a temporal prediction process. For example, a motion vector for a partition in the collocated picture may be used as a temporal motion vector predictor (MVP) in advanced motion vector prediction (AMVP) or as a temporal merge/skip candidate motion vector in a merge process. When the motion vector of the collocated block is used as a temporal MVP, a difference of the motion vector of the collocated block and the current motion vector of the current block is coded and sent from encoder 402 to decoder 403. When the motion vector of the collocated block is used in a merge process, the current block and the collocated block are merged and use the same motion vector of the collocated block.

The temporal MVP or temporal merge/skip candidate MV is defined as the MV of the selected collocated block, which resides in a reference picture and has the same geometrical position as a current block in the current picture. In one example, given a PU in a current picture, an associated collocated PU can reside in a preceding or subsequent PU in time. The collocated PU can be used as a candidate to enable MVP and merge/skip mode for the current PU. Like with a PU, a collocated block can be provided for a transform unit (TU), CU or a picture itself. Subsequent discussion will reference a picture, although the same could apply to any of the listed subcomponents of a picture or a slice. Additionally, a block may be referenced, which may be a PU, but may also be a TU, CU, a picture, or a slice.

When multiple reference pictures are possible, using a collocated block from a reference picture that is a larger temporal distance from a current picture may be less efficient than if a collocated block from a reference picture with a smaller temporal distance from the current picture is used. This is because when linear motion occurs, a motion vector from a collocated block that is closer in temporal distance will be most likely more similar to a current motion vector of the current block. This provides more efficiency in the coding process because there may be less difference from the motion vector of the collocated block from the current motion vector.

Figure 5:
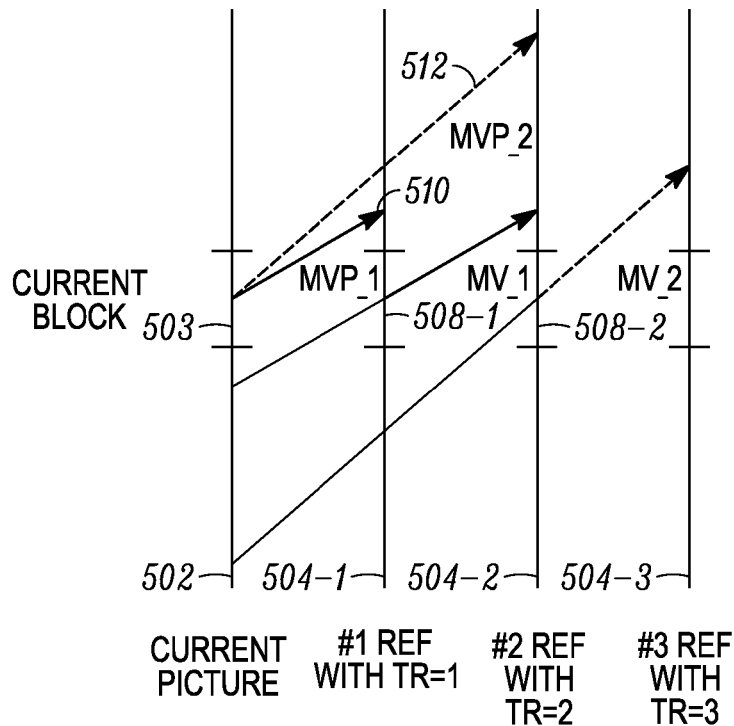
FIG. 5 shows an example of reference pictures of different temporal distances from a current picture according to one embodiment.

To illustrate the differences in temporal distance, FIG. 5 shows an example of reference pictures of different temporal distances from a current picture according to one embodiment. It should be understood that the reference pictures in both the future and the past may be considered. A current picture is shown at 502 and includes a current block shown at 503. Additional reference pictures #1, #2, and #3 are shown at 504-1, 504-2, and 504-3, respectively. Each reference picture is a different temporal distance from the current picture. For example, the reference picture at 504-1 includes a temporal distance of TR=1, reference picture 504-2 includes a temporal distance of TR=2, and reference picture 504-3 includes a temporal distance of TR=3, where a higher value for TR indicates are larger temporal distance from the current picture.

A motion vector MV_1 is a motion vector of a collocated block shown at 508-1 in reference picture #1 and a motion vector MV_2 is a motion vector for a collocated block shown at 508-2 in reference picture #2. The motion vector MV_1 or MV_2 may be used as a temporal MVP or temporal merge/skip candidate MV for the current block in the current picture. As shown at 510, a motion vector MVP_1 is based on motion vector MV_1 and at 512, a motion vector MVP_2 is based on motion vector MV_2. Particular embodiments select motion vector MV_1 to use as the temporal MVP or temporal merge/skip candidate MV because reference picture #1 is closest to the current picture in temporal distance. If used as the temporal MVP, motion vector MV_1 most likely would be more similar to the current motion vector for the current block assuming linear motion.

Figure 6:
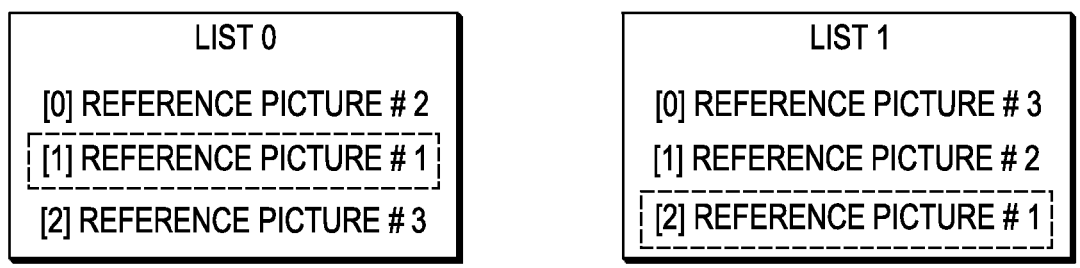
FIG. 6 shows an example of a list0 and a list1 according to one embodiment.

Accordingly, particular embodiments improve coding performance by selecting the collocated picture based on temporal distances between the current picture and a candidate set of reference pictures. As mentioned above, the collocated picture may be selected from a reference picture specified in one of two lists, referred to as list0 or list1. Depending on the arrangement of reference pictures in list0 or list1, the selected collocated picture may not be the first reference picture in either list0 or list1. FIG. 6 shows an example of a list0 and a list1 according to one embodiment. As shown, list0 and list1 are arranged in an index where a first position in the index is [0], a second position is [1], and so on. Different reference pictures may be associated with in the index positions, which may be referred to by a variable of RefPicList0[*i*] or RefPicList1[*j*]. For example, for list0, RefPicList0[0] points to reference picture #2, RefPicList0[1] points to reference picture #1, and RefPicList0[2] points to reference picture #3 from FIG. 5. Similarly, list1 includes the same index positions but may include different reference pictures or some of the same reference pictures found in list0, but possibly in different positions. For example, RefPicList1[0] points to reference picture #3, RefPicList1[1] points to reference picture #2, and RefPicList1[2] points to reference picture #1. Thus, if the reference picture with the smallest temporal distance from the current picture is to be selected, then, if list0 is used, the position RefPicList0[1] is used or if list1 is used, the position RefPicList1[2] is used.

Single List Example

In one embodiment, a flag labeled collocated_from_10_flag may be used to designate one of the two lists, list0 or list1, that should be used to identify the collocated picture. For example, if the flag collocated_from_10_flag is equal to 0, then list1 should be used. That is, the collocated picture is determined from a reference picture in list1. Alternatively, if the flag collocated_from_10_flag is equal to 1, then list0 is used. That is, the collocated picture is determined from a reference picture in list0. Specifically, a semantic that can be used in one method to identify a collocated picture is provided below. In the semantic, the flag collocated_from_10_flag, as identified above, is used along with variables identifying list0 and list1, labeled RefPicList1[*j*] and RefPicList1[*i*]. An additional variable, colPic, identifies the collocated picture.

In one embodiment, the syntax may be represented by the following semantic:

If slice_type is equal to B and collocated_from_10_flag is equal to 0, the variable colPic specifies the picture that contains the co-located partition as specified by RefPicList1[*j*], where j is the index corresponding to the reference which is not coded as intra picture with the minimum absolute temporal distance from the current picture/slice among all references available which is not coded as intra picture in RefPicList1.

Otherwise (slice_type is equal to B and collocated_from_10_flag is equal to 1 or slice_type is equal to P), the variable colPic specifies the picture that contains the co-located partition as specified by RefPicList0[*i*], where i is the index corresponding to the reference which is not coded as intra picture with the minimum absolute temporal distance from the current picture/slice among all references available which is not coded as intra picture in RefPicList0.

In the above semantic, if the slice type for a current picture is a B slice, and the collocated_from_10_flag is equal to 0, then the variable of colPic is set to specify a reference picture in list1 that is closest in in temporal distance to the current picture. For example, RefPicList1[*j*] is used where j is the index to the reference picture that is the minimum absolute temporal distance to the current picture. Reference pictures that are not coded as intra picture are not considered because these pictures do not include motion vectors because they are intra coded. Also, the minimum absolute temporal distance is used because the reference pictures may be before or after in time to the current picture.

Alternatively, if the sliceslice type of the current picture is equal to B and the collocated_from_10_flag is equal to 1, or the slice type is equal to P (when slice type is equal to P, only list0 is used), then the variable colPic is set to the reference picture in list0 that is closest in in temporal distance to the current picture. For example, RefPicListO[i] is set where i is the index in list0 for the reference picture that is the minimum absolute temporal distance to the current picture. Once again, reference pictures that are coded as intra picture are not considered because these pictures do not include motion vectors because they are intra coded.

Figure 7:
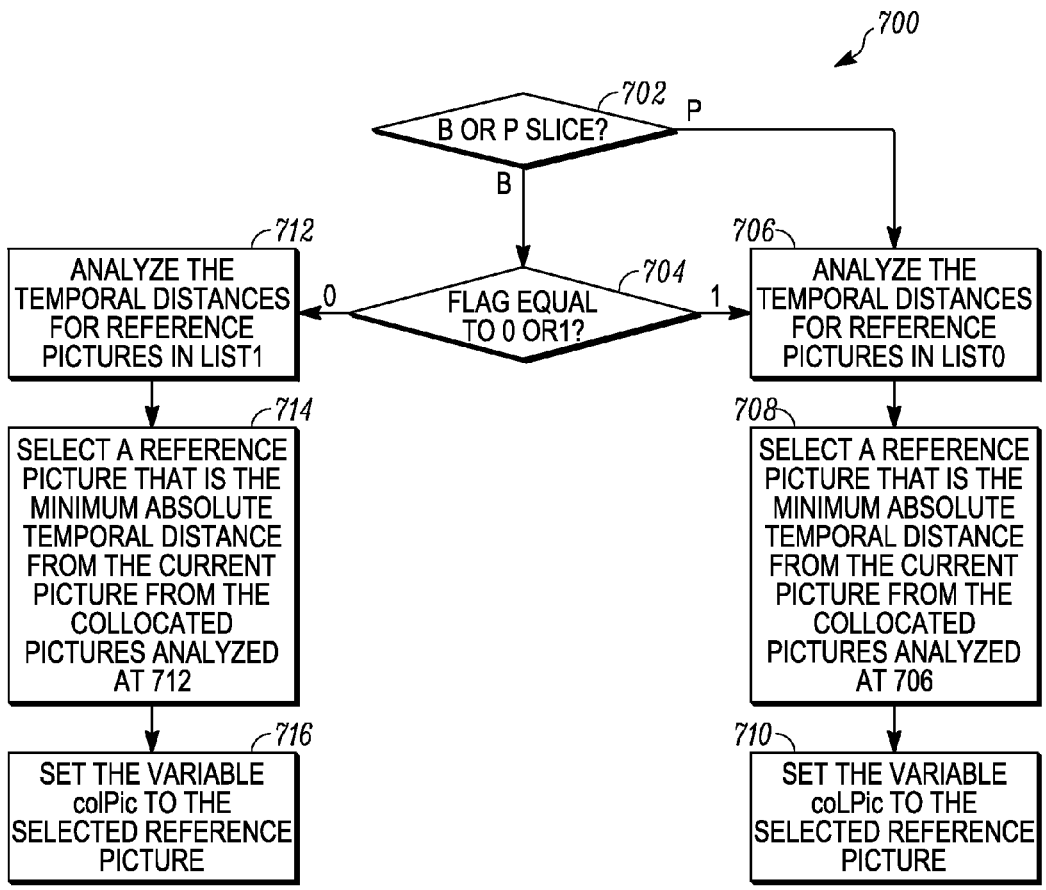
FIG. 7 depicts a simplified flowchart of a method for determining the collocated picture according to one embodiment.

FIG. 7 depicts a simplified flowchart 700 of a method for determining the collocated picture according to one embodiment. The method may be performed implicitly at encoder 402 or decoder 403. At 702, collocated picture manager 404 (in either encoder 402 or decoder 403) determines if the slice type of the current picture being encoded or decoded is a B slice or P slice. If the current slice is a B slice, at 704, collocated picture manager 404 determines if the flag collocated_from_10_flag is equal to 0 or 1. If the flag collocated_from_10_flag is equal to 1, then at 706, collocated picture manager 404 analyzes the temporal distances for reference pictures in list0. Additionally, if a P slice is being processed as determined in 702, the process at 706 is also performed. The temporal distances for reference pictures in list0 that are not coded as intra pictures may be analyzed in one embodiment.

At 708, collocated picture manager 404 selects a reference picture that is the minimum absolute temporal distance from the current picture from the collocated pictures analyzed at 706. At 710, collocated picture manager 404 sets the variable colPic to the selected reference picture.

If the flag collocated_from_10 value is 0, then the process described in 706, 708, and 710 are performed for list1. For example, at 712, collocated picture manager 404 analyzes the temporal distances for reference pictures in list1. The temporal distances for reference pictures in list1 that are not coded as intra pictures may be analyzed in one embodiment.

At 714, collocated picture manager 404 selects a reference picture that is the minimum absolute temporal distance from the current picture from the collocated pictures analyzed at 712. At 714, collocated picture manager 404 sets the variable colPic to the selected reference picture. Encoder 402 or decoder 403 can then use a motion vector for the collocated picture as a temporal MVP or a temporal merge/skip candidate MV.

Combined List Example

In another embodiment, the collocated picture may be selected from reference pictures among all eligible reference pictures available in both list0 and list1. That is, the collocated picture is defined to be the reference picture with the minimum absolute temporal distance from the current picture among all eligible references available in both list0 and list1. When this restriction is used, the syntax of collocated_from_10_flag may not be needed and can be removed. The flag does not need to be used because particular embodiments do not need to specify which list between list0 and list1 to use to determine the collocated picture. That is, both list0 and list1 are searched deeming a flag to indicate which list to search unnecessary. In one embodiment, the semantic for the above syntax change may be defined as:

If slice_type is equal to B, the variable colPic specifies the picture that contains the co-located partition as specified by RefPicList0[i], if i is the index corresponding to the reference which is not coded as intra picture with the minimum absolute temporal distance from the current picture/slice among all references available which is not coded as intra picture in RefPicList1 and RefPicList0.

Otherwise, RefPicList1[j], if j is the index corresponding to the reference which is not coded as intra picture with the minimum absolute temporal distance from the current picture/slice among all references available which is not coded as intra picture in RefPicList1 and RefPicList0.

Alternatively, in another embodiment, the semantic may be:

If slice_type is equal to B, the variable colPic specifies the picture that contains the co-located partition as specified by RefPicList1[i], if i is the index corresponding to the reference which is not coded as intra picture with the minimum absolute temporal distance from the current picture/slice among all references available which is not coded as intra picture in RefPicList1 and RefPicList0.

Otherwise, RefPicList0[j], if j is the index corresponding to the reference which is not coded as intra picture with the minimum absolute temporal distance from the current picture/slice among all references available which is not coded as intra picture in RefPicList1 and RefPicList0.

In the first semantic, if the slice_type of the current picture is a B slice, then the variable colPic is set to one of an index in whichever list—in list0 or list1—that includes a reference picture that is closest in temporal distance to the current picture. For example, list0 may be searched to determine an index position that includes a reference picture with the minimum absolute temporal distance from the current picture. All references may be searched that are not coded as intra picture in list0. Then, list1 may be searched to determine an index position to a reference picture that is the closest in temporal distance to the current picture. The variable colPic is set to either the index position in list0 or the index position in list1 of the collocated picture that is closest to the current picture. For example, if the reference picture in list0 is closer than the determined reference picture in list1, then colPic is set to RefPicList0[i], where i is the index position of the reference picture with the minimum absolute temporal distance to the current picture. Otherwise, colPic is set to RefPicList1[j], where j is the index position to the reference picture that is the minimum absolute temporal distance to the current picture. The alternative semantic searches list1 first, and then list0. Additionally, in other embodiments, all reference pictures not intra coded in list0 and list1 may be combined and searched for the reference picture with the minimum absolute distance to the current picture.

Figure 8:
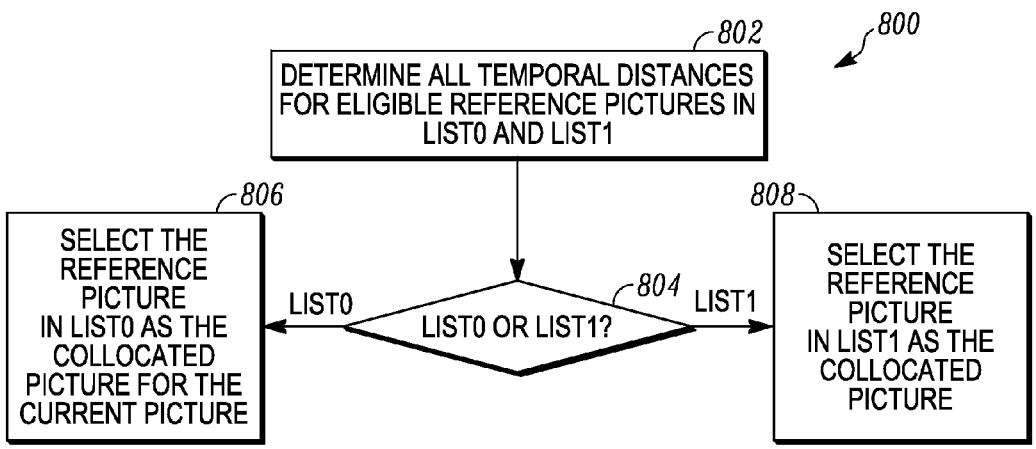
FIG. 8 depicts a simplified flowchart for the above semantics for selecting from both list0 and list1 according to one embodiment.

FIG. 8 depicts a simplified flowchart 800 for the above semantics for selecting from both list0 and list1 according to one embodiment. The method may be performed implicitly at encoder 402 or decoder 403. At 802, collocated picture manager 404 (in either encoder 402 or decoder 403) determines all temporal distances for eligible reference pictures in list0 and list1. As mentioned above, only reference pictures that are not coded as intra pictures may be eligible and also the minimum absolute temporal distance may be determined At 804, collocated picture manager 404 determines which of list0 or list1 includes a reference picture with the absolute minimum temporal distance. If list0 includes the reference picture, at 806, collocated picture manager 404 selects the reference picture in list0 as the collocated picture for the current picture. As discussed above, a variable colPic may be set to specify the index of the selected reference picture in list0. If list1 is selected in 804, then at 808, collocated picture manager 404 selects the reference picture in list1 as the collocated picture. As described above, the index position in list1 may be set as the variable colPic.

Combined List Example with Only First Reference Picture Considered

In yet another embodiment, collocated picture manager 404 may consider either the first reference picture in list0 or list1. Collocated picture manager 404 then determines which of the first reference pictures in list0 or list1 is closer in temporal distance to the current picture. For example, collocated picture manager 404 selects which of the first reference picture in list0 and the first reference picture in list1 has the smaller absolute temporal distance from the current picture. In this case, this reference picture is set as the collocated picture. When this semantic is used, the syntax including the flag collocated_from_10_flag may not be needed and can be removed. This is because both list0 and list1 are considered and a flag to define which of list0 and list1 to be used is not needed. The syntax may be summarized by the following semantic:

If slice_type is equal to B, the variable colPic specifies the picture that contains the co-located partition as specified by
RefPicList0[0], if RefPicList0[0] is not coded as intra picture and has smaller absolute temporal distance from the current picture/slice than RefPicList1[0].
Otherwise, RefPicList1[0], is used if RefPicList1[0] is not coded as intra picture.

Alternatively, the semantic can be:

If slice_type is equal to B, the variable colPic specifies the picture that contains the co-located partition as specified by
RefPicList1[0], if RefPicList1[0] is not coded as intra picture and has smaller absolute temporal distance from the current picture/slice than RefPicList0[0].
Otherwise, RefPicList0[0], is used if RefPicList0[0] is not coded as intra picture.

The above semantics determine the first reference pictures in both list0 and list1 and set the variable colPic to whichever of the first reference pictures in list0 and list1 has the minimum absolute temporal picture to the current picture. If one of the first reference pictures is coded as intra picture, then the other reference picture is used (if also not coded as intra picture).

Figure 9:
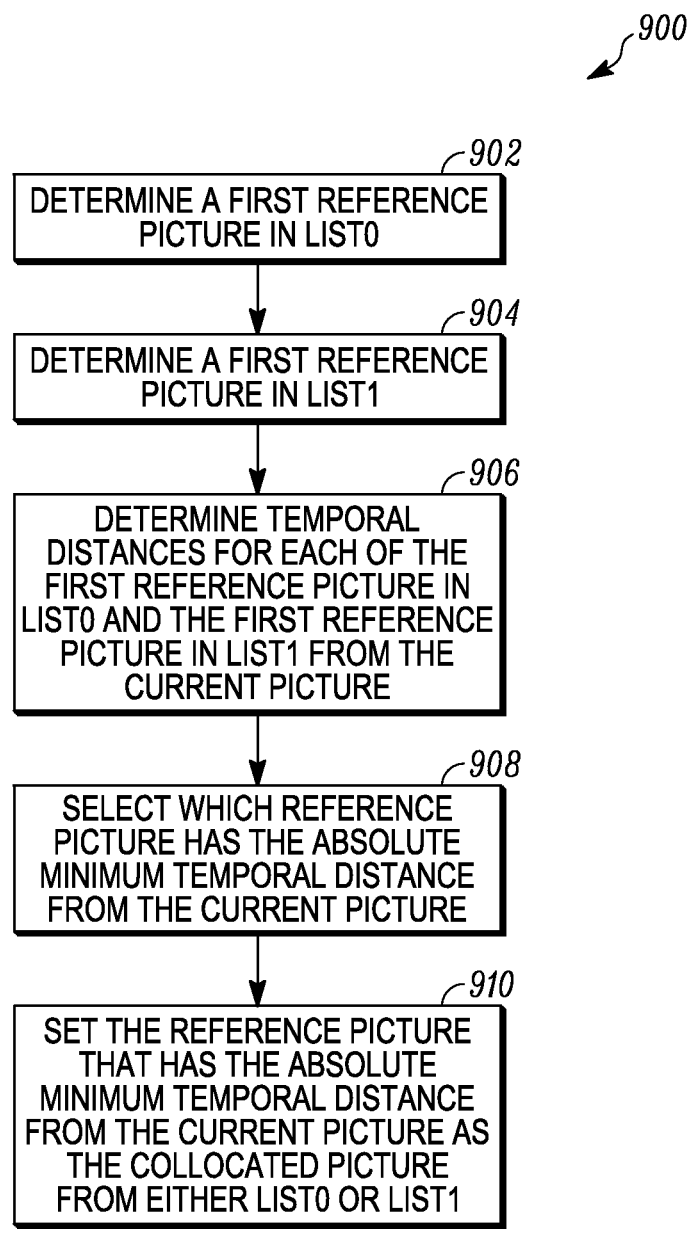
FIG. 9 depicts a simplified flowchart of a method for selecting from the first reference pictures in list0 and list1 according to one embodiment.

FIG. 9 depicts a simplified flowchart 900 of a method for selecting from the first reference pictures in list0 and list1 according to one embodiment. The method may be performed implicitly at encoder 402 or decoder 403. At 902, collocated picture manager 404 (in either encoder 402 or decoder 403) determines a first reference picture in list0. At 904, collocated picture manager 404 determines a first reference picture in list1. At 906, temporal distances for each of the first reference picture in list0 and the first reference picture in list1 from the current picture are determined At 908, collocated picture manager 404 selects which reference picture has the absolute minimum temporal distance from the current picture. Then, at 910, collocated picture manager 404 sets the reference picture that has the absolute minimum temporal distance from the current picture as the collocated picture from either list0 or list1. For example, as discussed above, the variable colPic may be set to the first index position in either list0 or list1.

Accordingly, particular embodiments provide different methods for implicitly determining a collocated picture to use for a current picture. Encoder 402 and decoder 403 can both perform a similar process to determine the collocated picture for the current picture. This eliminates the need to explicitly signal which reference picture to use in a set of reference pictures, such as the reference pictures in list0 or list1. This may improve coding efficiency as fewer bits may need to be sent in a bit stream.

Explicit Method to Signal Collocated Picture

The explicit method in this section is based on U.S. patent application Ser. No. 13/680,531 for "An Explicit Way for Signaling a Collocated Picture for High Efficiency Video Coding (HEVC)", filed on Nov. 19, 2012.

In order to have the flexibility to choose an optimal collocated picture, the collocated picture can be signaled explicitly, instead of implicitly. For explicit signaling, a syntax element is used to explicitly represent the collocated picture by using procedures including embodiments that may not use the first entry reference picture in list0 or list1, or alternatively references a picture to identify the collocated reference picture from a single list instead of two separate lists. Depending upon where the new syntax element is put to explicitly represent the collocated picture, one or two syntax elements may be needed for list0 and list1 or a single list that effectively removes the need to reference both list0 and list1 might alternatively be used in more efficient coding.

A. Explicit Syntax Using List0 and List1

In one embodiment method of explicitly identifying the collocated picture, an absolute picture order count (POC) difference is used to represent the reference picture. This method is implemented by using the POC and the difference between the current picture POC and a reference picture POC. The POC and delta POC are used to construct a reference picture set (RPS). The RPS is then used to create two lists list0 and list1 that identify a collocated picture that can be used to encode and decode a current picture. The method of this embodiment to identify a collocated picture can be performed using the syntax of FIG. 9.

Figures 10, 11:
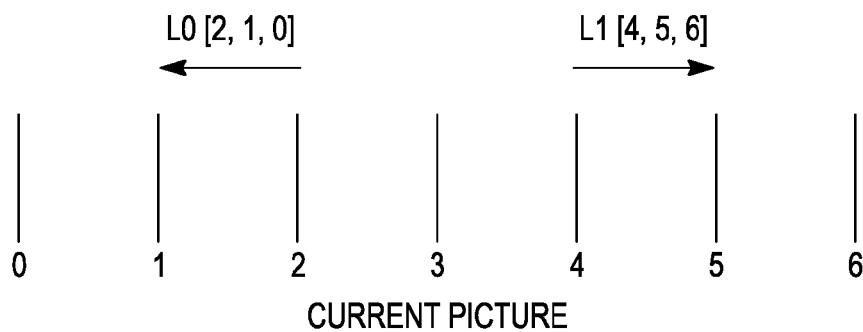
FIG. 10 provides a syntax listing illustrating one embodiment for identifying a collocated reference picture for use in decoding a current picture using two reference picture lists, list0 and list1.
FIG. 11 illustrates a group of pictures for an explanation of how the difference in picture order count between a current picture and a reference picture is determined FIG. 12 provides a flow chart illustrating a compilation syntax steps that can be used to identify a collocated picture to enable decoding and encoding of a current picture.

FIG. 10 begins by identifying a reference picture set index, ref_pic_set(idx), and identifying a number of negative and positive pictures for this reference picture set. The syntax variables for identifying the number of negative and positive variables, which are identical with the number of pictures in the list0 and list1, are num_negaive_pics and num_pos_pics. The negative and positive pictures help to determine the pictures in listO and list1 as can be explained with reference to FIG. 11. FIG. 11 illustrates a current picture 3 in a group of seven pictures with picture order count (POC) for the pictures ranging from 0 to 6. The negative pictures, or pictures that precede the current picture 3 include pictures 0-2. The positive pictures, or pictures that succeed the current picture 3 include pictures 4-6. As shown above the picture indicators, the negative pictures in list0 are represented as L0[2, 1, 0] in order after the current picture 3 where those numbers in the bracket are POC numbers of reference pictures in the list0 and, for example, the first entry of list0 is POC 2 and the second entry of list0 is POC 1 and so on. Similarly, the positive pictures in list1 are represented as L1[4, 5, 6] in order after the current picture 3. Keep in mind that pictures with POC 0, 1, 2, 4, 5 and 6 are encoded or decoded before picture 3.

The syntax of FIG. 10 continues by determining the difference between the current picture and a reference picture in the POC. This enables the list values for L0 and L1, shown in FIG. 10, to be converted to a more reasonable value by using difference coding. For example, with the syntax steps:
for(I=0; I<num_negative_pics; i++)
delta_poc_s0_minus1[i]
used_by_current_pic_s0_flag[i]

These steps subtract the listed pictures from the current picture in the POC to convert list L0[2, 1, 0] to a new delta POC list L0[1, 2, 3] so that it is more easy to code delta POC instead of POC themselves. In the meantime, a further step sets a current picture by using the used_by_current_pic_s0_flag to indicate whether the picture in the reference list0 is used or not. Similarly, with the syntax steps:

for(I=0; I<num_positive_pics; i++)
delta_poc_s1_minus 1 [i]
used_by_current_pic_s1_flag[i]

These steps subtract the listed pictures from the current picture in POC to convert list L1[4, 5, 6] to a new delta POC list L1[−1, −2, −3], and set a current picture by using used_by_current_pic_s1_flag to indicate whether the picture in the reference list1 is used or not.

FIG. 10 further includes significant syntax labeled with a "*". In this syntax, two variables are provided for the indexes for list0 and list1 in the reference picture set, ref_pic_set(idx), these variables being labeled collocated_picture_idx_list0 and collocated_picture_idx_list1 to specify the index for collocated picture in the list0 and list1, respectively. Further in this significant syntax, two variables for the number of current reference picture sets are provided labeled NumRpsCurrO[M] and NumRpsCurr1, which are also known as numbers of pictures for list0 and list1, respectively. The variables NumRpsCurr0 and NumRpsCurr1 identify the number of entries in the current reference picture sets, RefPicSetCurrO and RefPicSetCurrl, respectively.

With this significant syntax in FIG. 10, the collocated picture is signaled explicitly in one of list0 and list1 by the collocated_picture_idx_list0 and collocated_picture_idx_list1, respectively. First in the significant syntax, the number of pictures in the current reference picture set for list0, NumRpsCurr0, is checked to determine if it is greater than 1. If NumRpsCurr0 is zero, nothing is in list0, and if NumRpsCurr0 is one, the one reference picture listed in the list0 has to be the collocated picture. If however, NumRpsCurr0 is greater than one, then the syntax, collocated_picture_idx_list0, is reviewed to determine which reference picture is designated as a collocated picture. If collocated_picture_idx_list0 is not present, it is inferred to be equal to 0.

Second in the significant syntax of FIG. 10, the number of pictures in the current reference picture set for list1, NumRpsCurr1, is checked to determine if it is greater than 1. If NumRpsCurr1 is zero, nothing is in list1, and if NumRpsCurr1 is one, the one reference picture listed in the list1 has to be the collocated picture. If however, NumRpsCurr1 is greater than one, then the syntax, collocated_picture_idx_list1, is reviewed to determine which reference picture is designated as the collocated picture. If collocated_picture_idx_list1 is not present, it is inferred to be equal to 0.

Although not shown in the syntax of FIG. 10, a separate flag can be provided to identify which of the two listings, list0 or list1, identifies the collocated picture. The variable for the flag which will have two states, 1 or 0, is collocated_from_10_flag. If the collocated_from_10_flag is equal to 1, the reference picture in list0 indicated by the collocated_picture_idx_list0 will be used for the collocated picture, otherwise, the reference picture in list1 indicated by the collocated_picture_idx_list1 will be used as the collocated picture.

For a slice/picture type other than B-type, the collocated_from_10_flag is not present and will be set to 1 as a default value to indicate that list0 will be used by default. For B slice pictures, the collocated_from_10_flag can have either a 0 or 1 value to indicate which of list0 or list1 will be used.

In practice, the method shown by the syntax of FIG. 10 may be implemented to select a picture from a set of pictures as a collocated picture reference for a current picture. Several examples are provided to follow.

In a first example using the syntax of FIG. 10, collocated_from_10_flag is 1 and NumRpsCurr0 is 5. The delta POCs of reference pictures in the reference picture set, labeled RefPicSetCurr0, are {2, 5, 1, 4, 3}. If collocated_picture_idx_list0 is 2, the reference picture with delta POC as 1 from list0 will be used as the collocated picture for the current picture/slice.

In a second example, collocated_from_10_flag is 0 and NumRpsCurr1 is 5. The delta POC of reference pictures in the RefPicSetCurr1 are {3, 1, 2, 4, 5}. If collocated_picture_idx_list1 is 1, the reference picture with delta POC as 1 from list1 will be used as the collocated picture for the current picture/slice.

Figure 12:
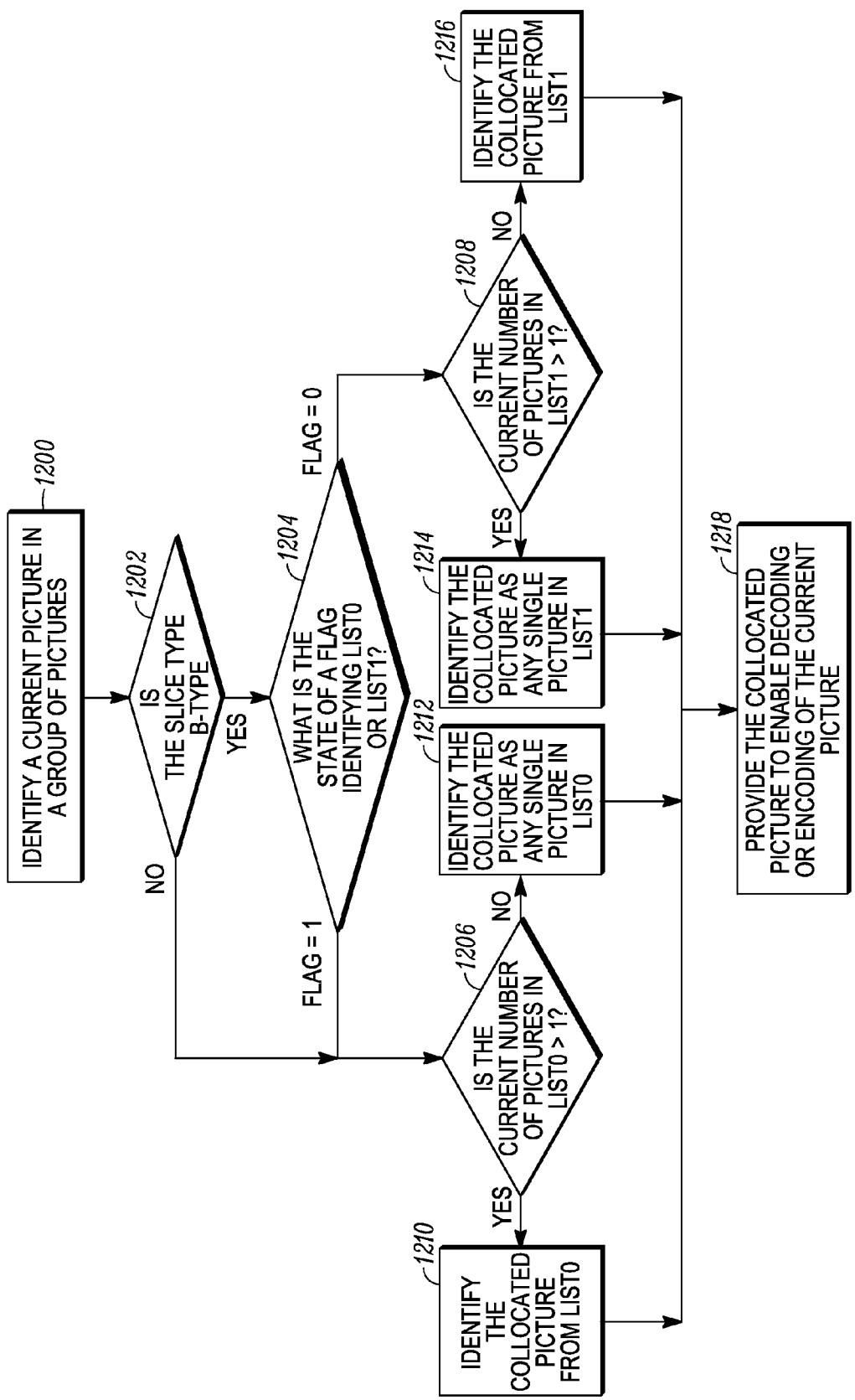

FIG. 12 provides a flow chart illustrating a compilation of syntax steps that can be used to identify a collocated picture to enable decoding and encoding of a current picture. First, in step 1200 a current picture in a group of pictures identified for encoding or decoding is provided. In step 1202, the slice type of the current picture is identified to determine if it is a B-type. If so a flag must be accessed in step 1204 to determine if the collocated picture is identified in list0 or list1. If the picture is other than a B-type, the method proceeds directly to step 1206 and assumes the listing with the collocated picture is list0. The determining step 1204 is used, the flag state determines if the method proceeds to step 1206 to examine list0 for the collocated picture, or if it proceeds to step 1208 to examine list1.

If list0 is to be examined, step 1206 looks to see if the current number of pictures in the list0 is greater than 1. If so, control proceeds to step 1210 to identify the collocated picture from list0. If in step 1206 the number of pictures is equal to one, the process proceeds to step 1212 to identify the collocated picture as the only picture in list0.

If list1 is to be examined, step 1208 looks to see if the current number of pictures in the list1 is greater than 1. If so, control proceeds to step 1214 to identify the collocated picture from list1. If in step 1208 the number of pictures is equal to one, the process proceeds to step 1216 to identify the collocated picture as the only picture in list1.

Finally, once the collocated picture is identified, the method proceeds to step 1218. Step 1218 provides the collocated picture to enable encoding or decoding the current picture.

B. Explicit Syntax Using a Single Reference List

As an alternative to the process shown by the syntax of FIG. 10, one can use one syntax, collocated_picture_idx which specifies the index for collocated picture at either list0 or list1, at the slice header to explicitly signal the collocated picture for a current slice, as shown in the syntax listing of FIG. 13. This way also uses collocated_from_10_flag to determine which of list0 or list1 is to be used prior to accessing the reference picture list. However, the syntax collocated_picture_idx may be put after collocated_from_10_flag. With this ordering, there will be no need to have two syntaxes. The syntax of FIG. 13 may thusly provide a more efficient system than that of FIG. 9.

For the syntax of FIG. 13, initially the slice type is identified with syntax variable slice_type. If the slice type is B, then the flag, collocated_from_10_flag is referenced to determine if the collocated picture will come from list0 or list1. For other slice types, the collocated_from_l0_flag is not present and the value of collocated_from_l0_flag is inferred to be equal to 1 that means that the collocated picture always comes from list0 and the "else" statement does not need to be checked. Similarly, if the collocated_from_l0_flag is 0, the "if" statement does not need to be checked.

Unlike the embodiment of FIG. 10, in FIG. 13 a single collocated_picture_idx is consulted that can identify the collocated picture. The flag can be set to 1 to indicate that the picture that contains a co-located partition shall be derived from the "if" syntax that examines pictures by using collocated_picture_idx from list0, otherwise the collocated picture shall be derived after the "else" statement from list1.

Similar to the embodiment of FIG. 10, in FIG. 13 two variables for the number of current reference picture sets are provided labeled NumRpsCurr0, and NumRpsCurr1. The variables NumRpsCurr0 and NumRpsCurr1, are number of reference pictures in the list0 and list1 respectively, identify the number of entries in the current reference picture sets. Thus in the syntax, the NumRpsCurr0 and NumRpsCurr1 are checked, depending on the "if" and "else" condition used to determine if it is greater than 1. If either are 0, then the set is empty and doesn't need to be evaluated. If either are 1, then the one index value identifies the collocated picture since it is the only one in the set, and that means the default value of collocated_picture_idx should be 0 and the collocated picture is the first and only picture in the corresponding reference list. If either are greater than 1, then the collocated_picture_idx syntax can be used to identify the collocated reference picture.

C. Explicit Collocated Picture with Efficient Syntax

The features common to both of the syntax for sections A and B above illustrate how an explicit method to identify a collocated picture can be performed. The syntax of section A requires more resources to identify the collocated picture. For example, searching through two separate lists, collocated_picture_idx_list0 and collocated_picture_idx_list1, must be performed to identify the collocated picture. By taking advance steps in the system of section B to eliminate a need to search through one of the lists by initially referencing a flag collocated_from_l0_flag, the syntax of section B eliminates resources required. Further, in Section B, the slice type is reviewed prior to even referencing the flag because if the slice type is I-type or P-type, and not B-type, the flag state will be known in advance.

Similar to the changes from syntax of section A to section B, other modifications of the syntax can be performed to make identification of the collocated picture more efficient. The common features of the syntax of sections A and B include: (1) identifying a current picture in a group of pictures for decoding or encoding; (2) providing syntax for identifying a collocated reference picture in the group of pictures; and (3) using the identified collocated picture to decode or encode the current picture.

Coding and encoding with the proposed syntax of FIGS. 10 and 13 may be performed in several ways. One possible way to code collocated_picture_idx_list0, collocated_picture_idx_list1, or collocated_picture_idx, is to use fixed length coding. The maximum bits used for these syntax is designated as a variable Ceil(Log2(max_num_ref_frames), where max_num_ref_frames specifies the maximum number of reference frames, complementary reference field pairs, and non-paired reference fields that may be used by the decoding process for inter prediction of any picture in the sequence.

For actual encoding, various conditions apply. For example, if collocated_from_l0_flag is 1 and NumRpsCurr0 is also 1, neither collocated_picture_idx_list0 nor collocated_picture_idx is coded. Likewise, if collocated_from_l0_flag is 0 and NumRpsCurr1 is 1, neither collocated_picture_idx_list1 nor collocated_picture_idx is coded. Depending on the coding procedure, a process following the syntax coding rules for encoding can be used for decoding.

Combined Method to Signal Collocated Picture

As described above, both explicit and implicit ways to signal which reference picture to use as the collocated picture were described. In one embodiment, both encoder 402 and decoder 403 may switch between the explicit and implicit methods. Accordingly, particular embodiments may use a flag explicit_collocated_picture to indicate which method should be used. For example, a flag explicit_collocated_picture may be set to 1 and signaled from encoder 402 to decoder 403. Then, decoder 403 uses the process described in the explicit signaling. If encoder 402 sets the explicit_collocated_picture flag to 0 and signals the flag to decoder 403, decoder 403 uses the implicit method as described above. The following depicts the syntax in which the flag explicit_collocated_picture may be provided in the picture parameter set (PPS):

| Picture parameter set RBSP syntax | |
|---|---|
| pic_parameter_set_rbsp( ) { | Descriptor |
| pic_parameter_set_id | ue(v) |
| seq_parameter_set_id | ue(v) |
| entropy_coding_mode_flag | u(1) |
| num_temporal_layer_switching_point_flags | ue(v) |
| for( i = 0; | |
| i < num_temporal_layer_switching_point_flags; i++ ) | |
| temporal_layer_switching_point_flag[ i ] | u(1) |
| num_ref_idx_l0_default_active_minus1 | ue(v) |
| num_ref_idx_l1_default_active_minus1 | ue(v) |
| pic_init_qp_minus26 /* relative to 26 */ | se(v) |
| constrained_intra_pred_flag | u(1) |
| slice_granularity | u(2) |
| shared_pps_info_enabled_flag | u(1) |
| explicit_collocated_picture | u(1) |
| if( shared_pps_info_enabled_flag ) | |
| if( adaptive_loop_filter_enabled_flag ) | |
| alf_param( ) | |
| if( cu_qp_delta_enabled_flag ) | |
| max_cu_qp_delta_depth | u(4) |
| rbsp_trailing_bits( ) | |
| } | |

Encoder and Decoder Examples

Figure 14A:
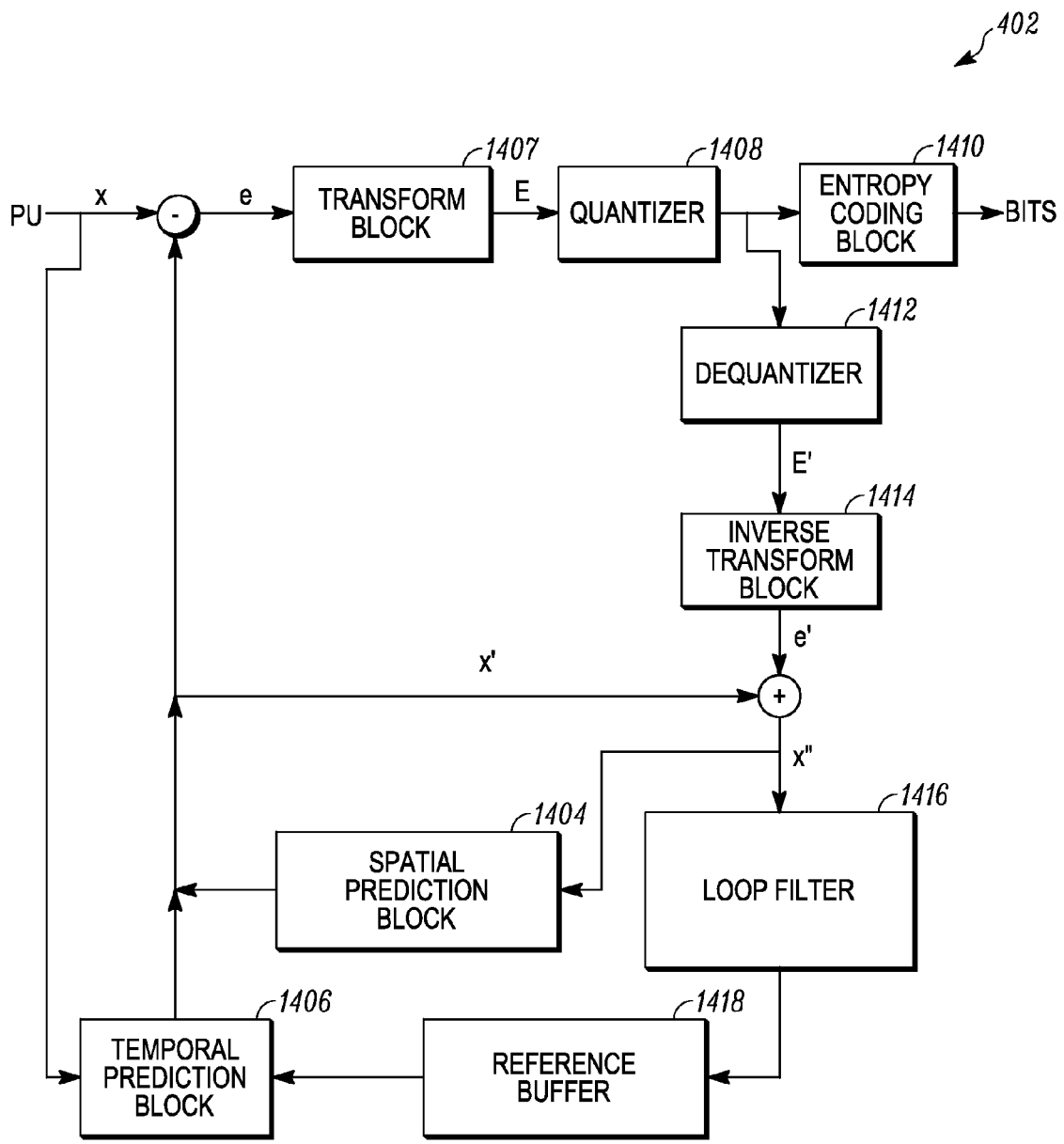
FIG. 14A depicts an example of encoder according to one embodiment.

In various embodiments, encoder 402 described can be incorporated or otherwise associated with a transcoder or an encoding apparatus at a headend and decoder 403 can be incorporated or otherwise associated with a downstream device, such as a mobile device, a set top box or a transcoder. FIG. 14A depicts an example of encoder 402 according to one embodiment. A general operation of encoder 402 will now be described; however, it will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. Spatial prediction relates to intra mode pictures. Intra mode coding can use data from the current input image, without referring to other images, to code an I picture. A spatial prediction block 1404 may include different spatial prediction directions per PU, such as horizontal, vertical, 45-degree diagonal, 135-degree diagonal, DC (flat averaging), and planar, or any other direction. The spatial prediction direction for the PU can be coded as a syntax element. In some embodiments, brightness information (Luma) and color information (Chroma) for the PU can be predicted separately. In one embodiment, the number of Luma intra prediction modes for all block size is 35. In alternate embodiments, the number of Luma intra prediction modes for blocks of any size can be 35. An additional mode can be used for the Chroma intra prediction mode. In some embodiments, the Chroma prediction mode can be called "IntraFromLuma."

Temporal prediction block 1406 performs temporal prediction. Inter mode coding can use data from the current input image and one or more reference images to code "P" pictures and/or "B" pictures. In some situations and/or embodiments, inter mode coding can result in higher compression than intra mode coding. In inter mode PUs 204 can be temporally predictive coded, such that each PU 204 of the CU 202 can have one or more motion vectors and one or more associated reference images. Temporal prediction can be performed through a motion estimation operation that searches for a best match prediction for the PU over the associated reference images. The best match prediction can be described by the motion vectors and associated reference images. P pictures use data from the current input image and one or more previous reference images. B pictures use data from the current input image and both previous and subsequent reference images, and can have up to two motion vectors. The motion vectors and reference pictures can be coded in the HEVC bitstream. In some embodiments, the motion vectors can be syntax elements "MV," and the reference pictures can be syntax elements "refIdx." In some embodiments, inter mode can allow both spatial and temporal predictive coding. The best match prediction is described by the motion vector (MV) and associated reference picture index (refIdx). The motion vector and associated reference picture index are included in the coded bit stream.

Transform block 1407 performs a transform operation with the residual PU, e. A set of block transforms of different sizes can be performed on a CU, such that some PUs can be divided into smaller TUs and other PUs can have TUs the same size as the PU. Division of CUs and PUs into TUs 20 can be shown by a quadtree representation. Transform block 1407 outputs the residual PU in a transform domain, E.

A quantizer 1408 then quantizes the transform coefficients of the residual PU, E. Quantizer 1408 converts the transform coefficients into a finite number of possible values. In some embodiments, this is a lossy operation in which data lost by quantization may not be recoverable. After the transform coefficients have been quantized, entropy coding block 1410 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 402, a de-quantizer 1412 de-quantizes the quantized transform coefficients of the residual PU. De-quantizer 1412 then outputs the de-quantized transform coefficients of the residual PU, E'. An inverse transform block 1414 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". Particular embodiments may be used in determining the prediction, such as collocated picture manager 404 is used in the prediction process to determine the collocated picture to use. A loop filter 1416 performs de-blocking on the reconstructed PU, x", to reduce blocking artifacts. Additionally, loop filter 1416 may perform a sample adaptive offset process after the completion of the de-blocking filter process for the decoded picture, which compensates for a pixel value offset between reconstructed pixels and original pixels. Also, loop filter 1416 may perform adaptive loop filtering over the reconstructed PU, which minimizes coding distortion between the input and output pictures. Additionally, if the reconstructed pictures are reference pictures, the reference pictures are stored in a reference buffer 1418 for future temporal prediction. Intra mode coded images can be a possible point where decoding can begin without needing additional reconstructed images.

Figure 14B:
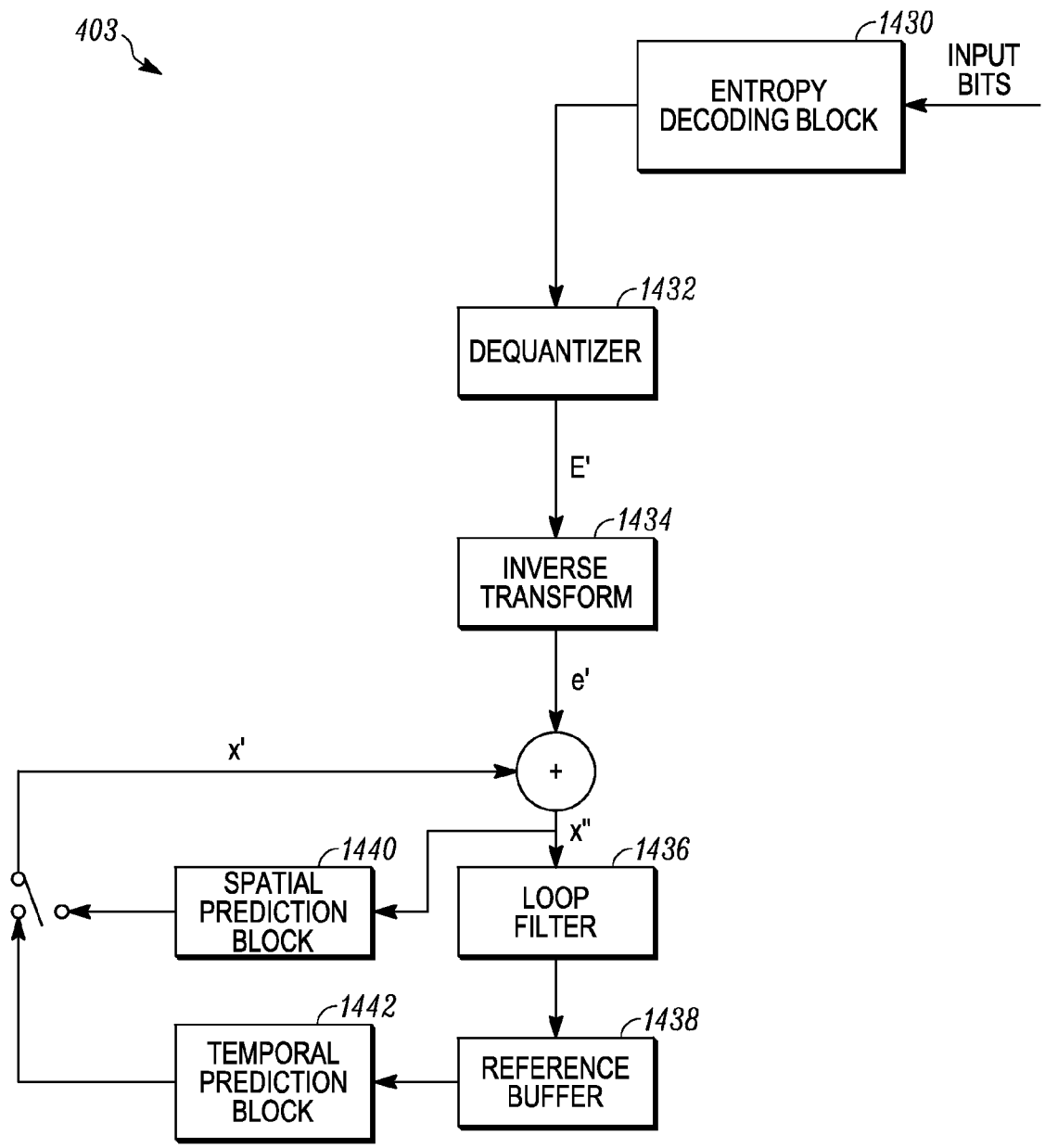
FIG. 14B depicts an example of decoder according to one embodiment.

FIG. 14B depicts an example of decoder 403 according to one embodiment. A general operation of decoder 403 will now be described; however, it will be understood that variations on the decoding process described will be appreciated by a person skilled in the art based on the disclosure and teachings herein. Decoder 403 receives input bits from encoder 402 for encoded video content.

An entropy decoding block 1430 performs entropy decoding on the input bitstream to generate quantized transform coefficients of a residual PU. A de-quantizer 1432 de-quantizes the quantized transform coefficients of the residual PU. De-quantizer 1432 then outputs the de-quantized transform coefficients of the residual PU, E'. An inverse transform block 1434 receives the de-quantized transform coefficients, which are then inverse transformed resulting in a reconstructed residual PU, e'.

The reconstructed PU, e', is then added to the corresponding prediction, x', either spatial or temporal, to form the new reconstructed PU, x". A loop filter 1436 performs de-blocking on the reconstructed PU, x", to reduce blocking artifacts. Additionally, loop filter 1436 may perform a sample adaptive offset process after the completion of the de-blocking filter process for the decoded picture, which compensates for a pixel value offset between reconstructed pixels and original pixels. Also, loop filter 1436 may perform adaptive loop filtering over the reconstructed PU, which minimizes coding distortion between the input and output pictures. Additionally, if the reconstructed pictures are reference pictures, the reference pictures are stored in a reference buffer 1438 for future temporal prediction.

The prediction PU, x', is obtained through either spatial prediction or temporal prediction. A spatial prediction block 1440 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 1406 performs temporal prediction through a motion estimation operation. Particular embodiments may be used in determining the prediction, such as collocated picture manager 404 is used in the prediction process to determine the collocated picture to use. A decoded motion vector is used to determine the prediction PU, x'. Interpolation may be used in the motion estimation operation.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, a list of reference pictures for a current picture to be encoded or decoded;
   determining, by the computing device, a temporal distance between the current picture and at least a portion of the reference pictures in the list of reference pictures;
   selecting, by the computing device, a reference picture that is not intra coded and that is closest in temporal distance from the current picture based on the determined temporal distance; and
   using, by the computing device, the selected reference picture as a collocated picture in a temporal prediction for encoding or decoding the current picture by using a motion vector of at least a portion of the collocated picture as a temporal motion vector predictor (MVP) or as a temporal merge/skip candidate motion vector.

2. The method of claim 1, wherein the list of reference pictures is one of a first list of reference pictures or a second list of reference pictures, wherein determining the temporal distance comprises determining the temporal distance between the current picture and the second list of reference pictures by:
   determining temporal distances for at least a portion of reference pictures in the second list from the current picture, wherein a reference picture from the at least a portion of reference pictures in the second list with a minimum absolute temporal distance that is not intra coded is the selected reference picture.

3. The method of claim 2, wherein determining the temporal distance between the current picture and the second list of reference pictures occurs on a condition that a flag is set to a value indicating the second list and a slice type of the current picture is equal to B.

4. The method of claim 1, wherein the list of reference pictures is one of a first list of reference pictures or a second list of reference pictures, wherein determining the temporal distance comprises determining the temporal distance between the current picture and the first list of reference pictures by:
   determining temporal distances for at least a portion of reference pictures in the first list from the current picture, wherein a reference picture from the at least a portion of reference pictures in the first list with an absolute minimum temporal distance that is not intra coded is the selected reference picture.

5. The method of claim 4, wherein determining the temporal distance between the current picture and the first list of reference pictures occurs when a flag is set to a value indicating the first list and a slice type of the current picture is equal to B or the slice type is equal to P.

6. The method of claim 1, wherein:
   the current picture comprises a first block, and
   a second block in the selected reference picture is selected as a collocated block for the first block.

7. The method of claim 6, wherein a motion vector of the collocated block is used as the temporal motion vector predictor (MVP) or as the temporal merge/skip candidate motion vector for the first block.

8. The method of claim 1, wherein the list of is one of a first list of reference pictures or a second list of reference pictures, wherein determining the temporal distance comprises:
   determining temporal distances for at least of a portion of reference pictures in each of the first list and the second list, wherein a reference picture from the at least a portion of reference pictures in each of the first list and the second list with a minimum absolute temporal distance that is not intra coded is the selected reference picture.

9. The method of claim 8, further comprising:
   determining which list of the first list and the second list for selecting the reference picture, wherein:
      when the computing device includes an encoder, the computing device sends the current picture, after encoding, to a decoder without signaling a flag indicating which list of the first list and the second list for selecting the reference picture; and
      when the computing device includes a decoder, the computing device receives the current picture, after encoding, from an encoder without receiving a flag indicating which list of the first list and the second list for selecting the reference picture.

10. The method of claim 1, wherein the list of pictures is one of a first list of reference pictures or a second list of reference pictures, each having a respective index list of sequential values identifying respective ones of the reference pictures and wherein determining the temporal distance comprises:
    determining temporal distances for first reference pictures in each of the first list and the second list having a lowest index value, wherein a reference picture from the first reference pictures with a minimum absolute temporal distance is selected as the collocated picture.

11. The method of claim 1, wherein the computing device includes a decoder, the method further comprising:
    selecting another reference picture explicitly for another current picture, comprising;
    receiving a flag having a first value indicating explicit reference picture selection for a temporal prediction process for decoding the another current picture.

12. The method of claim 11, wherein selecting another reference picture comprises:
    identifying the another current picture in a group of pictures for decoding;
    identifying a collocated picture in the group of pictures using syntax to determine if a collocated picture index should be accessed to identify the collocated picture; and
    using the collocated picture to decode the another current picture.

13. The method of claim 1, wherein the computing device includes a decoder, wherein the selected reference picture is selected implicitly, further comprising;
   receiving a flag that indicates implicit reference picture selection in the temporal prediction for the current picture.

14. A method comprising:
   determining, by a computing device, a flag value indicating which of a first list of reference pictures or a second list of reference pictures to use, each of the first list and the second list having a respective index list of sequential index values identifying respective ones of the reference pictures;
   if the flag value is a first value, selecting, by the computing device, a reference picture with a minimum absolute temporal distance from a current picture in eligible reference pictures in the first list, wherein the eligible reference pictures in the first list exclude intra coded pictures of the first list of reference pictures;
   if the flag value is a second value, selecting, by the computing device, a reference picture with a minimum absolute temporal distance from a current picture in eligible reference pictures in the second list, wherein the eligible reference pictures in the second list exclude intra coded pictures of the second list of reference pictures;
   setting, by the computing device, a variable value to an index value of the selected reference picture in either the first list or the second list, wherein the selected reference picture includes a collocated block to a current block in the current picture for use in the temporal prediction; and
   performing a temporal prediction using the selected reference picture in either the first list or the second list identified by the variable value; wherein:
      when the computing device includes an encoder, the computing device encodes the current picture using the temporal prediction and sends the current picture, after encoding, to a decoder without sending the selected index value to the decoder; and
      when the computing device includes a decoder, the computing device receives the current picture, after encoding, from an encoder without receiving the selected index value from the encoder and decodes the current picture using the temporal prediction.

15. The method of claim 14, wherein a motion vector of the collocated block of the selected reference picture is used as a temporal motion vector predictor (MVP) or as a temporal merge/skip candidate motion vector for the current block.

16. The method of claim 14, wherein the first list is used if a slice type of the current picture is equal to a B slice or a P slice and the second list is used if the slice type is equal to the B slice.

17. A decoder comprising:
   one or more computer processors; and
   a non-transitory computer-readable storage medium comprising instructions that, when executed, control the one or more computer processors to be configured for:
   determining a list of reference pictures for a current picture to be decoded;
   determining a temporal distance between the current picture and at least a portion of the reference pictures in the list of reference pictures;
   selecting a reference picture that is not intra coded and that is closest in temporal distance from the current picture based on the determined temporal distance; and
   using the selected reference picture as a collocated picture to decode the current picture in a temporal prediction by using a motion vector of at least a portion of the collocated picture as a temporal motion vector predictor (MVP) or as a temporal merge/skip candidate motion vector.

18. The decoder of claim 17, wherein the list of reference pictures is one of a first list of reference pictures or a second list of reference pictures, wherein determining the temporal distance comprises determining the temporal distance between the current picture and the second list of reference pictures, the decoder further configured for:
   determining temporal distances for at least a portion of reference pictures in the second list from the current picture, wherein a reference picture from the at least a portion of reference pictures in the second list with a minimum absolute temporal distance is selected as the collocated picture.

19. The decoder of claim 18, wherein determining the temporal distance between the current picture and the second list of reference pictures occurs when a flag is set to a value indicating the second list and a slice type of the current picture is equal to B.

20. The decoder of claim 17, wherein:
   the current picture comprises a first block, and
   a second block in the selected reference picture is a collocated block for the first block.

21. The decoder of claim 20, wherein a motion vector of the collocated block is used as the temporal motion vector predictor (MVP) or as the temporal merge/skip candidate motion vector for the first block.

22. The decoder of claim 17, wherein the decoder receives the current picture, after encoding, without receiving an index value of the selected reference picture from an encoder.

23. An encoder comprising:
   one or more computer processors; and
   a non-transitory computer-readable storage medium comprising instructions that, when executed, control the one or more computer processors to be configured for:
   determining a list of reference pictures for a current picture to be encoded;
   determining a temporal distance between the current picture and at least a portion of the reference pictures in the list of reference pictures;
   selecting, based on results of the determining, a reference picture that is closest in temporal distance from the current picture; and
   using the selected reference picture as a collocated picture to encode the current picture in a temporal prediction by using a motion vector of at least a portion of the collocated picture as a temporal motion vector predictor (MVP) or as a temporal merge/skip candidate motion vector.

24. The encoder of claim 23, wherein the list of reference pictures is one of a first list of reference pictures or a second list of reference pictures the encoder further configured for:
   determining the temporal distance by determining temporal distances for at least a portion of reference pictures in only the second list from the current picture, wherein a reference picture from the at least a portion of reference pictures in the second list with a minimum absolute temporal distance that is not intra coded is selected as the collocated picture.

25. The encoder of claim 24, wherein determining temporal distances for at least a portion of the reference pictures in only the second list of reference pictures occurs when a flag is set to a value indicating the second list and a slice type of the current picture is equal to B.

26. The encoder of claim 23, wherein:
the current picture comprises a first block, and
a second block in the selected reference picture is a collocated block for the first block.

27. The encoder of claim 26, wherein a motion vector of the collocated block is used as the temporal motion vector predictor (MVP) or as the temporal merge/skip candidate motion vector for the first block.

28. The encoder of claim 23, wherein the encoder sends the current picture, after encoding, without sending an index value of the selected reference picture to a decoder.

29. The method of claim 1, wherein:
when the computing device includes an encoder, the computing device sends the current picture, after encoding, to a decoder without sending an index value of the selected reference picture to the decoder; and
when the computing device includes a decoder, the computing device receives the current picture, after encoding, from an encoder without receiving the index value of the selected reference picture from the encoder.

30. The method of claim 14, wherein:
the index value of the selected reference picture is other than a lowest index value in either the first list or the second list.

* * * * *